US007663622B2

(12) United States Patent
Kim et al.

(10) Patent No.: US 7,663,622 B2
(45) Date of Patent: Feb. 16, 2010

(54) UNIFIED FRAMEWORK BASED ON EXTENSIBLE STYLES FOR 3D NON-PHOTOREALISTIC RENDERING AND METHOD OF CONFIGURING THE SAME

(75) Inventors: Sung Ye Kim, Taejon (KR); Ji Hyung Lee, Taejon (KR); Bo Youn Kim, Taejon (KR); Hee Jeong Kim, Seoul (KR); Bon Ki Koo, Taejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 475 days.

(21) Appl. No.: 11/634,945

(22) Filed: Dec. 7, 2006

(65) Prior Publication Data

US 2007/0132755 A1    Jun. 14, 2007

(30) Foreign Application Priority Data

Dec. 8, 2005 (KR) ........................ 10-2005-0119709
Jun. 21, 2006 (KR) ........................ 10-2006-0056049

(51) Int. Cl.
 *G06T 15/00* (2006.01)
(52) U.S. Cl. ...................... 345/419; 345/420; 345/421; 345/426; 345/582; 345/629; 345/440; 345/443; 348/E5.029; 348/E5.054; 382/199; 382/254
(58) Field of Classification Search ................ 345/419, 345/420, 421, 426, 582, 629, 440, 443; 382/199, 382/254; 348/E5.029, E5.054
See application file for complete search history.

(56) References Cited

U.S. PATENT DOCUMENTS 5,847,712 A * 12/1998 Salesin et al. ............... 345/582
6,593,924 B1    7/2003 Lake et al.
7,113,191 B2 * 9/2006 Lake et al. .................. 345/582

OTHER PUBLICATIONS

Perry et al. "A new Framework For Non-Photorealistic Rendering" Mitsubishi Electric Research Laboratory, Mar. 27, 2001.

* cited by examiner

*Primary Examiner*—Kimbinh T Nguyen
(74) *Attorney, Agent, or Firm*—Lowe Hauptman Ham & Berner, LLP

(57) ABSTRACT

There are provided a unified framework based on extensible styles for 3D non-photorealistic rendering and a method of configuring the framework. The unified framework includes: 3D model data processing means for generating a scene graph by converting a 3D model input into 3D data and organizing the scene graph using vertexes, faces, and edges; face painting means for selecting a brusher to paint faces (interiors) of the 3D model using the scene graph; line drawing means for extracting line information from the 3D model using the scene graph and managing the extracted line information; style expressing means for generating a rendering style for the 3D model and storing the rendering style as a stroke, the rendering style being equally applied to a face-painting method and a line-drawing method; and rendering means for combining the stroke and the selected brusher to render the 3D model using both the face-painting method and the line-drawing method. The framework can be used to develop tools and new rendering styles for non-photorealistic rendering and animation.

13 Claims, 5 Drawing Sheets

UNIFIED FRAMEWORK BASED ON EXTENSIBLE STYLES FOR 3D NON-PHOTOREALISTIC RENDERING AND METHOD OF CONFIGURING THE SAME

BACKGROUND OF THE INVENTION

1. Field of the Invention

The present invention relates to a framework for 3D non-photorealistic rendering and a method of configuring the framework, and more particularly, to a framework that renders a 3D model in a general and intuitive manner like the way an artist selects a style and paints a model with the selected style and has a flexible style expandability for efficient non-photorealistic rendering by using a unified concept of expressing various rendering styles using just two rendering methods (face painting and line drawing), and a method of configuring the framework.

2. Description of the Related Art

With the increasing interest in non-photorealistic rendering and animation, a number of researches have been conducted to generate images in an artistic style that look like a painting or drawing. Early researches are focused on developing non-photorealistic rendering and animation systems that are individually dedicated to expressing a particular rendering style. Such systems use a non-photorealistic rendering pipeline that is obtained by slightly modifying a traditional rendering pipeline.

Recently, unified frameworks have been researched to establish such an individual non-photorealistic rendering pipeline and provide a non-photorealistic rendering that is different from the existing photorealistic rendering. In a framework for non-photorealistic rendering based on a particle (1996), a particle is used to determine the position of a stroke (denoting a brush touch). The particle-based framework is the earliest framework that is still in use. Further, examples of recently proposed frameworks include a framework that expresses a 3D model using an adaptively sampled distance field (ADF) (an article titled "A New Framework for Non-photorealistic rendering", 2001) and a framework based on a graphic processing unit (GPU). However, in the above-described frameworks, main concerns of non-photorealistic rendering systems (i.e., processing techniques for expressing styles) are not mentioned.

A framework somewhat different from the above-described frameworks is disclosed in "OpenNPAR (2003, an article titled 'OpenNPAR: A system for developing, programming, and designing non-photorealistic animation and rendering')." This OpenNPAR system is an OpenInventor-based framework, in which each rendering style for expressing a non-photorealistic effect is matched with a combination of components and a desired style is generated by recombining the components. Although the OpenNPAR system modularizes detail non-photorealistic rendering styles (detail functions) and expresses a number of styles by recombining the modularized styles, the OpenNPAR system has a complicated basic concept in intuitive and non-photorealistic expressing. Further, the OpenNPAR system has a complicated basic pipeline that supports a developer (develops modules), a programmer (produces modifiers using the modules), a designer (generates styles using the modifiers), and a user.

SUMMARY OF THE INVENTION

Accordingly, the present invention is directed to a unified framework based on extensible styles for 3D non-photorealistic rendering and a method of configuring the framework, which substantially obviates one or more problems due to limitations and disadvantages of the related art.

It is an object of the present invention to provide a unified framework based on extensible styles for 3D non-photorealistic rendering and a method of configuring the framework. The framework has an intuitive structure such that rendering styles can be conveniently expanded for both face-painting and line-drawing methods.

It is another object of the present invention to provide a rendering system employing a unified framework based on extensible styles for 3D non-photorealistic rendering, the unified framework unifying all rendering methods using face-painting and line-drawing methods such that system developers can easily provide styles satisfying designers' demand.

Therefore, the rendering styles generated by the unified framework of the present invention can be intuitively used for rendering a 3D model without distinguishing the interior, outside, and lines of the 3D model.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a unified framework based on extensible styles for 3D non-photorealistic rendering, the unified framework including: 3D model data processing means for generating a scene graph by converting a 3D model input into 3D data and organizing the scene graph using vertexes, faces, and edges; face painting means for selecting a brusher to paint faces (interiors) of the 3D model using the scene graph; line drawing means for extracting line information from the 3D model using the scene graph and managing the extracted line information; style expressing means for generating a rendering style for the 3D model and storing the rendering style as a stroke, the rendering style being equally applied to a face-painting method and a line-drawing method; and rendering means for combining the stroke and the selected brusher to render the 3D model using both the face-painting method and the line-drawing method.

In another aspect of the present invention, there is provided a method of configuring a unified framework based on extensible styles for 3D non-photorealistic rendering. The method configures the framework to render a 3D model in a general and intuitive manner like an artist selects a style and paints a model with the selected style, and to apply various rendering styles to face-painting and line-drawing such that all 3D models can be rendered only by face-painting and line-drawing regardless of rendering styles for the 3D models.

In a further another aspect of the present invention, there is provided a method of configuring a unified framework based on extensible styles for 3D non-photorealistic rendering, the method including the step of configuring the unified framework to generate a rendering style for a 3D model and simultaneously apply the style by combining the style with a face-painting brusher and a line-drawing brusher, wherein the step of configuring the unified framework includes: parsing 3D model data of the 3D model according to a predetermined format to generate a scene graph; organizing the 3D model data based on vertexes, faces, and edges using the scene graph; selecting a brusher for painting an interior of the 3D model using the scene graph; extracting line characteristic information including silhouette, crease, and boundary line information by using the scene graph; generating interior lines (hatch lines) using the scene graph for the interior of the 3D model; and generating a rendering style for being used to render the 3D model finally.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

A unified framework based on extensible styles for 3D non-photorealistic rendering will now be described in detail with reference to the accompanying drawings according to preferred embodiments of the present invention.

Figure 1:
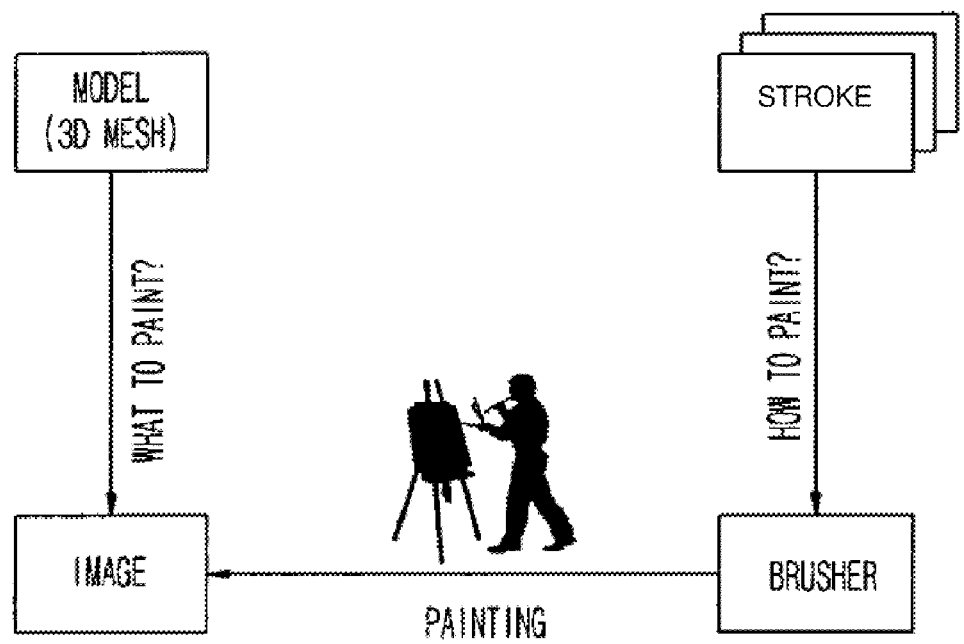
FIG. 1 is a schematic view illustrating a framework for non-photorealistic rendering according to the present invention.

FIG. 1 is a schematic view illustrating a framework for generating a non-photorealistically rendered image according to the present invention. Referring to FIG. 1, the framework of the present invention is configured based on the way a person draws a picture.

In the framework of the present invention, non-photorealistic images are rendered by imitating the way an artist paints a picture and based on the concept that all non-photorealistic images can be rendered through interior area (face) painting and line drawing.

The framework can be easily expanded and modified for non-photorealistically rendering a 3D model using various styles. For this, the framework is configured such that rendering is performed using two methods (face painting and line drawing) for a 3D model selected for "what to paint?" and a style selected for "how to paint" is defined as a pair of a stroke and a brusher (rendering tool).

Figure 2:
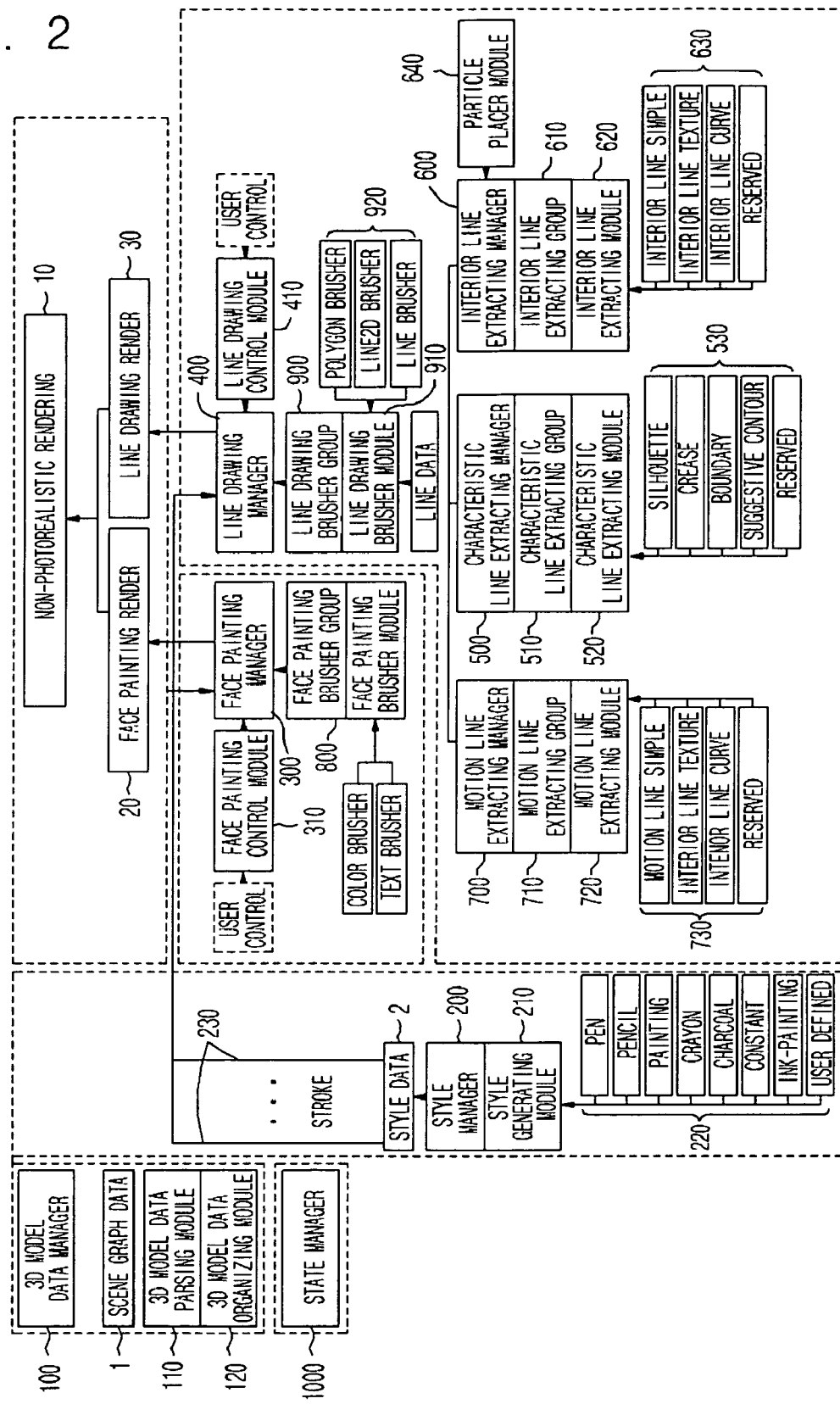
FIG. 2 is a block diagram illustrating a framework for non-photorealistic rendering according to an embodiment of the present invention.

FIG. 2 is a block diagram illustrating a framework for non-photorealistic rendering according to an embodiment of the present invention. Each part of the non-photorealistic rendering framework will now be described with reference to FIG. 2 according to the embodiment of the present invention.

The non-photorealistic rendering framework includes a 3D model data manager 100, a style manager 200, a face painting manager 300, a line drawing manager 400, a characteristic line extracting manager 500, an interior line extracting manager 600, a motion line extracting manager 700, a face painting brusher group 800, a line drawing brusher group 900, and a state manager 1000.

In detail, the 3D model data manager 100 is a processor that processes and manages all 3D data used in the non-photorealistic rendering framework. The 3D model data manager 100 includes a 3D model data parsing module 110 that reads 3D model data and generates a scene graph in a predetermined format, and a 3D model data organizing module 120 that expresses the generated scene graph using vertexes, faces, and edges.

The style manager 200 is a processor that produces and manages non-photorealistic rendering styles used in the non-photorealistic rendering framework. The style manager 200 includes a style generating module 210 providing common functions for generating various styles, and a detail style generating module 220 for expressing detail features of each style generated by the style generating module 210.

The face painting manager 300 is a processor for painting faces (interior areas) of a 3D model used in the non-photorealistic framework according to a rendering style generated by the style manager 200. The face painting manager 300 includes a face painting control module 310 for receiving controls from a user.

The line drawing manager 400 is a processor for drawing lines of a 3D model used in the non-photorealistic framework according to a rendering style generated by the style manager 200. The line drawing manager 400 includes a line drawing control module 410 for receiving controls from a user.

The characteristic line extracting manager 500 is a process that extracts characteristic lines from a 3D model used in the non-photorealistic rendering framework and manages the extracted characteristic lines. The characteristic line extracting manager 500 includes a characteristic line extracting group 510 that provides upper functions commonly used for extracting characteristic lines, a characteristic line extracting module 520 that provides a common interface based on each extracted characteristic line, and a detail characteristic line extracting module 530 that extracts characteristic lines according to detail categories.

The interior line extracting manager 600 is a process that generates interior lines (hatch lines) of a 3D model used in the non-photorealistic rendering framework. The interior line extracting manager 600 includes an interior line extracting group 610 that provides upper functions commonly used for generating interior lines, an interior line extracting module 620 providing a common interface based on each generated interior line, a detail interior line extracting module 630 extracting interior lines according to detail categories, and a particle placer module 640 determining start positions when interior lines are generated.

The motion line extracting manager 700 is a process that generates motion lines of a 3D model used in the non-photorealistic rendering framework. The motion line extracting manager 700 includes a motion line extracting group 710 that provides upper functions commonly used for generating motion lines, a motion line extracting module 720 providing a common interface based on each generated motion line, and a detail motion line extracting module 730 extracting motion lines according to detail categories.

The characteristic line extracting manger 500, the interior line extracting manager 600, and the motion line extracting manager 700, which are provided for generating three kinds of lines, have the same configuration. Thus, the framework can be easily extended or modified according to the size of a developed system.

The face painting brusher group 800 is a processor for painting the inside of a 3D model used in the non-photorealistic rendering framework. The face painting brusher group 800 includes a brusher group 810 providing a face painting brusher as a painting tool and a brusher module 820 providing a detail face painting function.

The line drawing brusher group 900 is a processor for drawing lines of a 3D model used in the non-photorealistic rendering framework. The line drawing brusher group 900 includes a line drawing brusher module 910 providing a line drawing brusher as a line drawing tool and a detail line drawing brusher module 920 providing a detail line drawing function. The state manager 1000 stores and manages states of all processors of the non-photorealistic framework and states of a system developed based on the non-photorealistic framework.

A face painting render 20 and a line drawing render 30 perform rendering functions (face painting and line drawing) using data output from the above-described processors 100 to 900 based on states stored in the state manager 1000. Processing operations of the processors 100 to 900 are performed for each frame of a rendering model by a non-photorealistic render 10.

Figure 4:
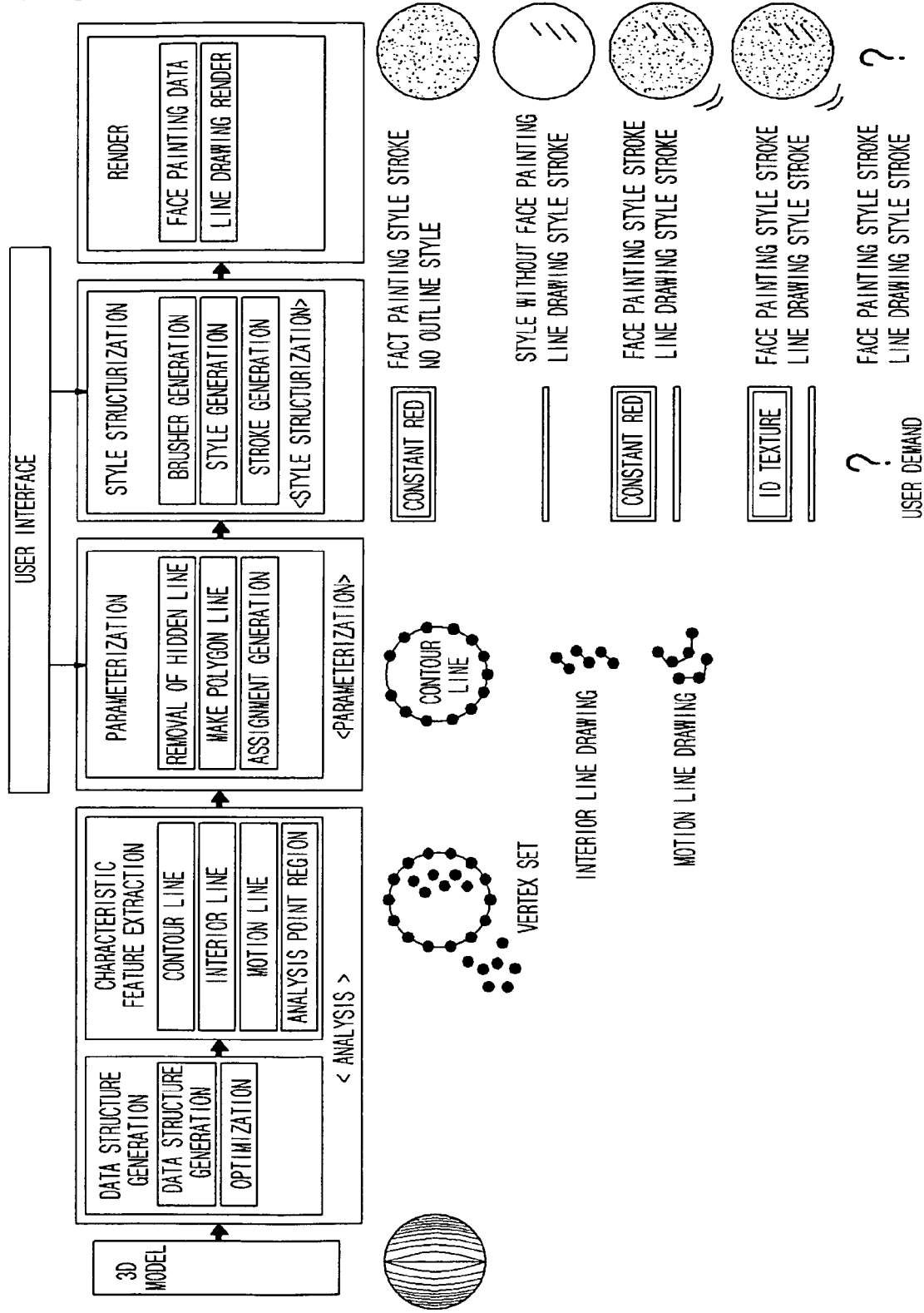
FIG. 4 is a view for explaining intermediate outputs of operation steps of a non-photorealistic rendering framework according to the present invention.

The structures and functions of the processors 100 to 900 of the non-photorealistic rendering framework shown in FIG. 2 will now be more fully described with reference to FIG. 4 that shows intermediate outputs of the processors 100 to 900.

The 3D model data manager 100 performs various functions for processing 3D data using a scene graph generated by the 3D model data parsing module 110. The 3D model data organizing module 120 performs the most importance function in the non-photorealistic rendering process using the scene graph. That is, the 3D model data organizing module 120 calculates boundary information for vertexes and faces. Therefore, in the non-photorealistic rendering framework of the present invention, all physical data are stored based on vertexes, and in other structures, pointer information of the vertexes are used. Thus, costs for storing and processing data can be minimized.

That is, in the framework of the present invention, an Xparser is provided as a basic module for parsing directX data, and optimization is performed by searching and removing overlapped vertex information to improve the efficiency of vertex-based calculation since the directX data are stored in the form of a connected structure of overlapped vertexes. Here, a current vertex is compared with a vertex located after the current vertex in the data structure (one-on-one comparison) to determine whether it is overlapped. Therefore, the time for this optimization depends on the number of vertexes of an object.

The style manager 200 manages color and test information and allows the face painting manager 300 and the line drawing manager 400 to access a stroke array 230 in which various styles are stored for expressing a 3D model using various styles. The style generating module 210 performs common functions for generating styles using information expressed using 3D model data such as vertexes, faces, and edges by the 3D model data manager 100, and the detail style generating module 220 determines detail features of the generated styles. That is, the style generating module 210 provides a common interface for the detail style generating module 220, so that a user (or a developer) can easily expand the style.

The face painting manager 300 and the line drawing manager 400 perform uppermost managing functions for painting faces and drawing lines, respectively. That is, the face painting manager 300 and the line drawing manager 400 manage rendering works of the render processors 10, 20, and 30.

The characteristic line extracting manager 500 is a processor including modules that extracts characteristic lines and performs management functions. That is, the characteristic line extracting manager 500 extracts characteristic lines collectively called contour. When the characteristic line extracting group 510 extracts characteristic lines, the characteristic line extracting module 520 provides a common interface according to each characteristic line. The detail characteristic line extracting module 530 extracts detail characteristic lines for the extracted characteristic lines through the common interface according to detail categories, thereby extracting characteristic lines called contour.

That is, the framework of the present invention provides basic characteristic lines: silhouette, crease, boundary, and suggestive contour lines. Typical tools available in the market provide functions for extracting silhouette, crease, and boundary lines. The suggestive contour line extracting scheme has been recently developed. The framework of the present invention is configured such that a user (or a developer) can easily apply an additional structure to the framework for extracting characteristic lines of new types.

When the characteristic line extracting manager 500 extracts a 3D contour from an object, the interior line extracting manager 600 generates interior lines for expressing the faces (defined between contour lines) of the object. The interior lines are defined using start points and directions. The start points of the interior lines are defined by the particle placer module 640. Additionally, the start points of the interior lines can be manually defined by an end user through the line drawing control module 410 in a device configured based on the framework of the present invention. The interior lines are defined from the start points along directional fields generated by the 3D model data manager 100. The interior lines may be straight or curved depending on the direction fields. Like the characteristic line extracting manager 500, the interior line extracting manager 600 is configured such that a user (or a developer) can easily apply an additional structure for generating interior lines having a different type.

The motion line extracting manager 700 generates motion lines for each frame of a rendering image according to motions obtained by animating the rendering image regardless of geometrical information of a 3D model. Like in the interior line extracting manager 600, initial positions of the motion lines can be determined by receiving inputs from a used through the line drawing control module 410.

The interior painting brusher group 800 and the line drawing brusher group 900 are tools actually performing face painting and line drawing. Each brusher is coupled with a stroke expressing a style for drawing an image according to a predetermined style. That is, a stroke expressing a style generated by the style manager 200 is coupled to each brusher selected from the face painting brusher group 800 and the line drawing brusher group 900, such that the number of styles can be N*M when the used numbers of strokes and brushers are N and M.

Although the brushers of the framework of the present invention are classified into the face painting brusher group 800 and the line drawing brusher group 900, common brushers can be used for face painting and line drawing. The brushers include a 3D polygon brusher, a 2D projection brusher, a 2D brusher, a color brusher, and a texture brusher in order to express a given style.

Since the framework of the present invention is configured based on face painting and line drawing, the state manager 1000 manages the overall operation of the framework and the face painting and line drawing operations of the framework. The framework of the present invention has a very intuitive and easily understandable structure, such that the state of the framework can be simply performed.

The non-photorealistic render 10 calls the face painting render 20 and the line drawing render 30 and performs line drawing and face painting by using data generated or extracted by the processors of the framework.

Figure 3:
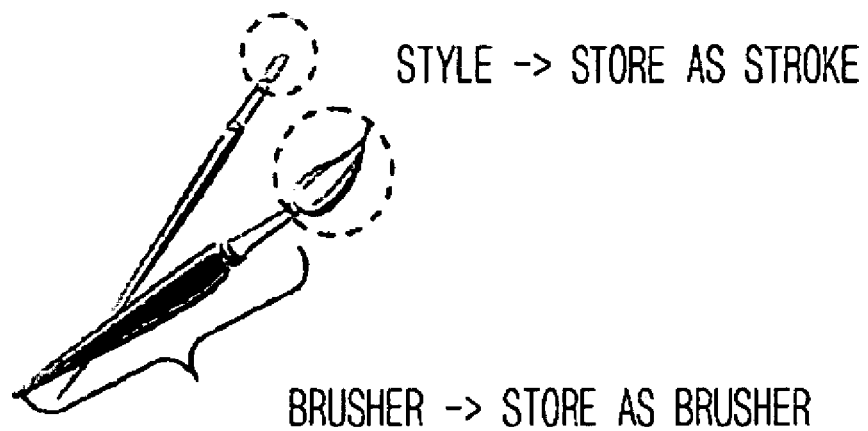
FIG. 3 is a schematic view illustrating a set of a style and a brusher used in a non-photorealistic rendering framework as a basic component for style expression according to the present invention.

FIG. 3 is a schematic view illustrating a set of a style and a brusher used in a non-photorealistic rendering framework as a basic component for style expression according to the present invention. That is, the brusher is coupled with a predetermined stroke expressing a particular style, and then it is used as a tool for painting or drawing faces and lines in an intuitive manner.

Figure 5:
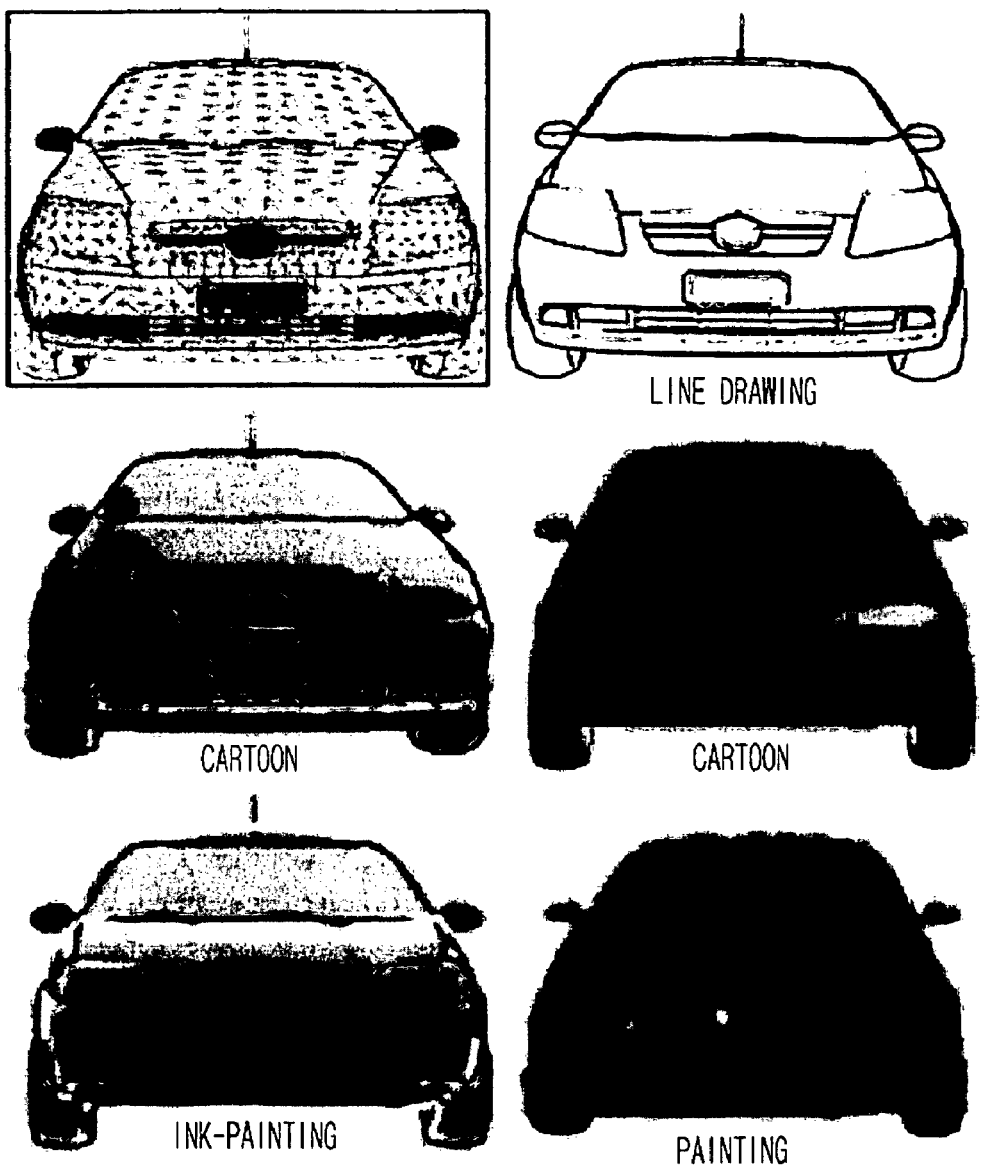
FIG. 5 shows examples of rendering styles developed based on a non-photorealistic rendering framework according to the present invention.

FIG. 5 shows exemplarily images rendered using various styles generated by a non-photorealistic rendering system developed based on the framework of the present invention.

As described above, according to the unified framework base on extensible styles for 3D non-photorealistic rendering, functions for generating various non-photorealistic rendering styles are included in the same structure (the style manager 200) to use the functions in the same way, and an intuitive painting tool (refer to FIG. 3) for expressing a particular style is made by replacing a stroke coupled to a brusher with another stroke expressing the particular style, such that each required function can be effectively provided for non-photorealistic rendering. Further, every non-photorealistic rendering style is expressed by the unified concept of face painting and line drawing, so that easily understandable framework can be provided. As a result, tools and styles can be easily developed for non-photorealistic rendering and animation.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A unified framework based on extensible styles for 3D non-photorealistic rendering, the unified framework comprising:
   3D model data processing means for generating a scene graph by convening a 3D model into 3D data and organizing the scene graph using vertexes, faces, and edges;
   style expressing means for generating a rendering style for the 3D model based on the 3D data including said vertexes, faces, and edges, and for storing the generated rendering style as a stroke, the rendering style being commonly applied to both a face-painting method and a line-drawing method;
   face painting means for selecting a face-painting brusher, in accordance with the generated rendering style, to paint interior faces of the 3D model using the scene graph;
   line drawing means for selecting a line-drawing brusher, in accordance with the generated rendering style, to draw lines of the 3D model using the scene graph; and
   rendering means for combining the stroke and the selected brushers to render the 3D model using both the face-painting method and the line-drawing method.

2. The unified framework of claim 1, wherein the 3D model data processing means comprises:
   a 3D model data parsing module for generating the scene graph by convening the 3D model input into the 3D data; and
   a 3D model data organizing module for organizing the scene graph using said vertexes, faces, and edges.

3. The unified framework of claim 1, wherein
   the face painting means comprises brusher group processing means for providing face-painting brushers according to the face painting method, and
   the line drawing means comprises brusher group processing means for providing line-drawing brushers according to the line-drawing method.

4. The unified framework of claim 1, wherein
   the line drawing means is further for extracting line information from the 3D model using the scene graph and managing the extracted line information; and
   said line drawing means comprises a characteristic line extracting manager, an interior line extracting manager, and a motion line extracting manager all of which have the same structure.

5. The unified framework of claim 4, wherein
   the characteristic line extracting manager comprises a characteristic line extracting group, a characteristic line extracting module, and a detail characteristic line extracting module,
   the interior line extracting manager comprises an interior line extracting group, an interior line extracting module, and a detail interior line extracting module, and
   the motion line extracting manager comprises a motion line extracting group, a motion line extracting module, and a detail motion line extracting module.

6. The unified framework of claim 5, wherein each of the detail characteristic line extracting module, the detail interior line extracting module, and the detail motion line extracting module comprises user defining means for allowing addition of a new structure defined by a user.

7. The unified framework of claim 5, wherein the style expressing means comprises:
   a style generating module for generating the rendering style; and
   a detail style generating module for expressing a detail feature of the generated rendering style,
   wherein the style generating module and the detail style generating module have the same structure as the characteristic line extracting manager, the interior line extracting manager, and the motion line extracting manager of the line drawing means.

8. The unified framework of claim 7, wherein the detail style generating module comprises user defining means for allowing addition of a new style defined by a user.

9. The unified framework of claim 3, wherein
   the line-drawing brushers comprise a 3D polygon brusher, a 2D projection brusher, and a brusher that has an unchangeable property due to absence of 3D information, and
   the face-painting brushers comprise a color brusher and a texture brusher.

10. The unified framework of claim 3, wherein the stroke is used in combination with the brushers selected from the brusher group processing means of the face painting means or the line drawing means, such that the 3D model is rendered in N*M methods when the number of used strokes is N and the number of used brushers is M.

11. The unified framework of claim 1, wherein the rendering means performs rendering using information output from the face painting means and the line drawing means according to the generated style and expresses all non-photorealistic rendering styles using the face-painting method and the line-drawing method.

12. A method of configuring a unified framework based on extensible styles for 3D non-photorealistic rendering, the method comprising the steps of:

parsing, by a processor, 3D model data of a 3D model according to a predetermined format to generate a scene graph;

organizing, by a processor, the 3D model data based on vertexes, faces, and edges using the scene graph;

generating, by a processor, a rendering style for both face-painting and line-drawing of the 3D model, based on the 3D model data including said vertexes, faces, and edges;

selecting, by a processor, a face-painting brusher, in accordance with the generated rendering style, for painting interior faces of the 3D model using the scene graph; and selecting, by a processor, a line-drawing brusher, in accordance with the generated rendering style, to draw lines of the 3D model using the scene graph.

13. The method of claim 12, wherein a common brusher is selected for both face-painting and line-drawing.

* * * * *